(12) United States Patent
Bostick et al.

(10) Patent No.: US 10,169,849 B2
(45) Date of Patent: Jan. 1, 2019

(54) CONTEXTUAL PERSONALIZED FOCUS FOR VARIABLE DEPTH OF FIELD PHOTOGRAPHS ON SOCIAL NETWORKS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 15/349,104

(22) Filed: Nov. 11, 2016

(65) Prior Publication Data

US 2018/0137604 A1    May 17, 2018

(51) Int. Cl.
| | | |
|---|---|---|
| *G06K 9/40* | (2006.01) | |
| *G06T 5/00* | (2006.01) | |
| *G06K 9/00* | (2006.01) | |
| *G06F 17/30* | (2006.01) | |
| G06Q 50/00 | (2012.01) | |

(52) U.S. Cl.
CPC ........ *G06T 5/002* (2013.01); *G06F 17/30268* (2013.01); *G06K 9/00288* (2013.01); *G06Q 50/01* (2013.01); *G06T 2207/30201* (2013.01)

(58) Field of Classification Search
CPC ........... H04N 1/00307; H04N 1/00318; H04N 21/44222; H04N 21/4516

USPC ........ 382/255, 156, 157, 158, 160; 128/925, 128/706

See application file for complete search history.

(56) References Cited

U.S. PATENT DOCUMENTS

| | | | |
|---|---|---|---|
| 7,051,351 B2 * | 5/2006 | Goldman | G06Q 30/02 348/E7.071 |
| 7,212,330 B2 | 5/2007 | Seo et al. | |
| 7,606,953 B2 * | 10/2009 | Ash | H04N 7/163 710/62 |
| 7,620,309 B2 | 11/2009 | Georgiev | |
| 7,653,702 B2 * | 1/2010 | Miner | G06F 17/30038 709/201 |

(Continued)

OTHER PUBLICATIONS

Lytro, https://illum.lytro.com/illum, Accessed Nov. 7, 2016, 5 pages.

(Continued)

*Primary Examiner* — Yosef Kassa

(74) *Attorney, Agent, or Firm* — Christopher K. McLane; Andrew D. Wright; Roberts Mlotkowski Safran Cole & Calderon, P.C.

(57) ABSTRACT

Systems and methods for automatically rendering variable depth of field photographs are disclosed. A method includes: receiving, by a computer device, a photograph; determining, by the computer device, a viewing user to receive the photograph; determining, by the computer device, a contextual personalized focus for the photograph for the viewing user; rendering, by the computer device, a version of the photograph based on the determined contextual personalized focus; and providing, by the computer device, the rendered version of the photograph to the viewing user.

13 Claims, 4 Drawing Sheets

(56) References Cited

U.S. PATENT DOCUMENTS

| | | | | |
|---|---|---|---|---|
| 8,200,649 B2* | 6/2012 | Bennett | G06F 17/30265 | 707/705 |
| 8,237,771 B2* | 8/2012 | Kurtz | G06K 9/00711 | 348/14.01 |
| 8,249,397 B2* | 8/2012 | Wood | G06F 3/016 | 382/305 |
| 8,255,416 B2* | 8/2012 | Listou | G06F 9/44 | 707/769 |
| 8,473,490 B2* | 6/2013 | Bonilla | G06Q 50/22 | 707/732 |
| 8,873,851 B2* | 10/2014 | Fedorovskaya | G06F 17/30247 | 382/170 |
| 8,953,084 B2 | 2/2015 | Kamath | | |
| 9,183,515 B2* | 11/2015 | Gundotra | G06Q 10/00 | |
| 9,213,754 B1* | 12/2015 | Zhang | G06F 17/30867 | |
| 2008/0019680 A1* | 1/2008 | Kasahara | G03B 7/08 | 396/48 |
| 2015/0110413 A1 | 4/2015 | Eronen et al. | | |
| 2015/0113661 A1 | 4/2015 | Mishra | | |
| 2015/0213305 A1 | 7/2015 | Sundström | | |

OTHER PUBLICATIONS

Microsoft Lumia Refocus App, https://www.microsoft.com/en-us/store/apps/refocus/9nblggh0d8n5, Accessed Nov. 7, 2016, 6 pages.

HTC One M8 Duo, http://www.htc.com/us/support/htc-one-m8/howto/464949.html, Accessed Nov. 7, 2016, 1 page.

Samsung Galaxy S5, http://www.samsung.com/uk/consumer/mobile-devices/smartphones/galaxy-s/SM-G900FZKABTU, Accessed Nov. 7, 2016, 11 pages.

Mayo, "KGI: iPhone 7 Plus likely to feature dual-camera system for better photos using LinX tech, 2-3x optical zoom", https://9to5mac.com/2016/01/27/kgi-iphone-7-plus-likely-to-come-with-dual-camera-system-for-better-photos-2-3x-optical-zoom/, Jan. 27, 2016, 3 pages.

* cited by examiner

US 10,169,849 B2

CONTEXTUAL PERSONALIZED FOCUS FOR VARIABLE DEPTH OF FIELD PHOTOGRAPHS ON SOCIAL NETWORKS

BACKGROUND

The present invention generally relates to photograph processing and, more particularly, to a system and method for contextual personalized focus for variable depth of field photographs on social networks.

Variable depth of field photographs allow a user to modify the focus point of a picture after the picture has been taken. The user can, for example, change from focusing on an object in the foreground of the picture to an object in the background of the picture. This is currently a manual process whereby a user selects an object in a variable depth of field photograph and the photograph is rendered to show this selected object as the focus point.

Traditional fixed depth of field photographs define a focus point when a photograph is captured, which in turn determines what is in and out of focus in that photograph. Variable depth of field photography is an emerging technology whereby software is used to modify the depth of field in post processing of a photograph. This allows the focus point to be changed after a picture has been taken—effectively allowing the user to change what is in or out of focus in a photograph.

There are several technologies that support variable depth of field. These technologies are implemented both on dedicated cameras and on mobile devices. A light field camera is a dedicated camera that captures information about the intensity of light in a scene, and also captures information about the direction that the light rays are traveling. This data is then reconstructed as a photograph where the user can select the focus point. Merged multiple exposure is a regular camera (such as a mobile device camera) that takes multiple pictures of the same scene, each with a different focus point, and merges these into a single picture file. When a user selects an area to focus on, the exposure that best focuses on the selected area is used. Dual lens cameras use a secondary lens to capture depth information when a photograph is taken with the primary lens. This collects rudimentary depth information which can be processed in software to enable a variable depth of field. Software blurring is a technique in which software analyzes a photograph's areas of contrast and applies a blur effect to various regions to simulate a shallow depth of field.

SUMMARY

In a first aspect of the invention, there is a method that includes: receiving, by a computer device, a photograph; determining, by the computer device, a viewing user to receive the photograph; determining, by the computer device, a contextual personalized focus for the photograph for the viewing user; rendering, by the computer device, a version of the photograph based on the determined contextual personalized focus; and providing, by the computer device, the rendered version of the photograph to the viewing user.

In another aspect of the invention, there is a computer program product that includes a computer readable storage medium having program instructions embodied therewith. The program instructions are executable by a computing device to cause the computing device to: determine a contextual personalized focus for a variable depth of field photograph based on social network data of a viewing user; render a version of the photograph based on the determined contextual personalized focus; and provide the rendered version of the photograph to a social media feed of the viewing user.

In another aspect of the invention, there is a system that includes: a CPU, a computer readable memory and a computer readable storage medium associated with a computing device; program instructions to receive a photograph from a posting user of a social media service; program instructions to determine a first contextual personalized focus for the photograph based on social network data of a first viewing user; program instructions to render a first version of the photograph based on the first contextual personalized focus; program instructions to provide the first rendered version of the photograph to a social media feed of the first viewing user; program instructions to determine a second contextual personalized focus for the photograph based on social network data of a second viewing user; program instructions to render a second version of the photograph based on the second contextual personalized focus; and program instructions to provide the second rendered version of the photograph to a social media feed of the second viewing user. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
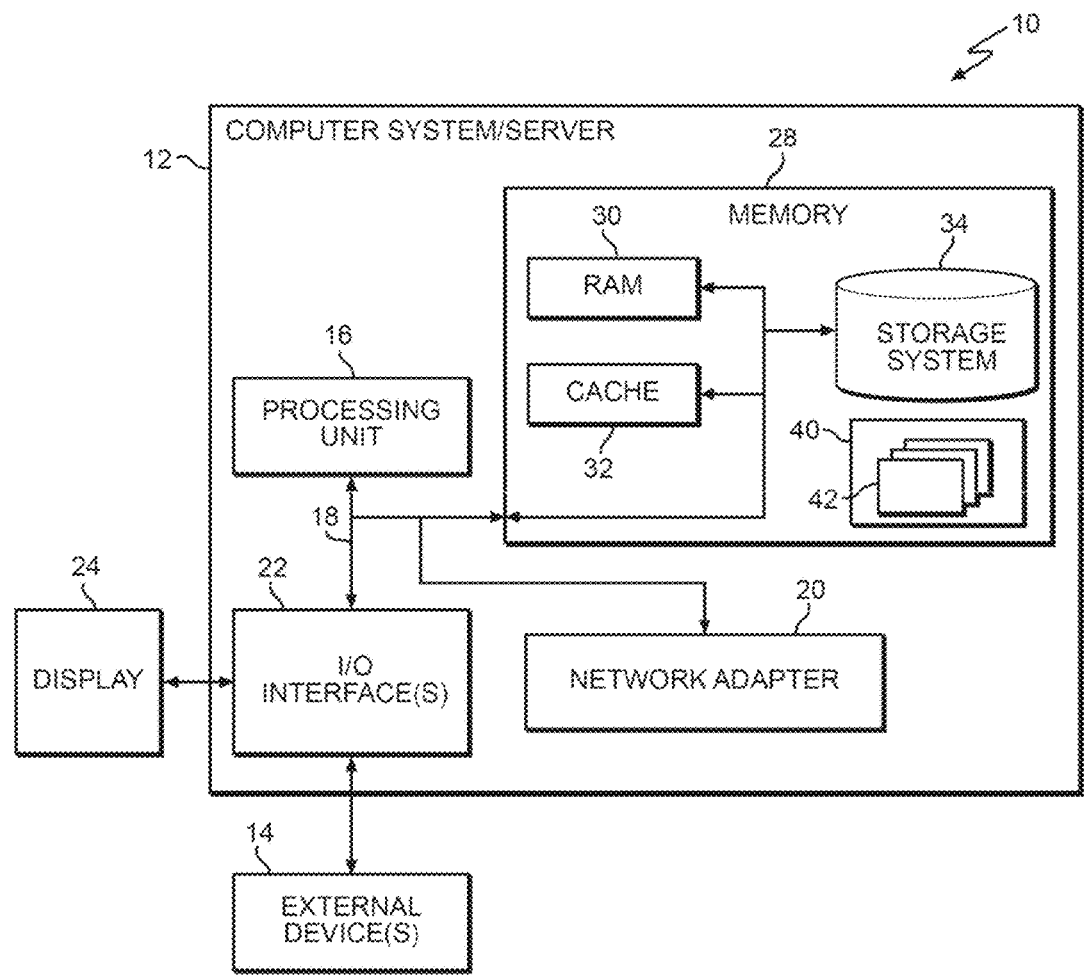
FIG. 1 depicts a computing infrastructure according to an embodiment of the present invention.

The present invention generally relates to photograph processing and, more particularly, to a system and method for contextual personalized focus for variable depth of field photographs on social networks. Aspects of the invention are directed to rendering a variable depth of field photograph in which contextual personalized focus is used to automatically and dynamically tailor the focus point of the picture to the user that is viewing the picture. In embodiments, the contextual personalized focus utilizes a weighting system to consider a user's relationships and relevance to people and objects appearing in the photograph, in addition to social network sentiment and engagement history. In this manner, a variable depth of field photograph that is shared on a social network can be automatically and dynamically rendered differently for different viewing users, e.g., with a first focus point for a first viewing user and with a second focus point for a second viewing user.

Variable depth of field photographs may be shared using a static photograph in which the photographer uses software to manually select an appropriate focus point, save the photograph with the selected focus point, and export the saved photograph to other users as a static photograph (i.e., a photograph that the receiving user cannot change the focus point). Variable depth of field photographs may also be shared using a dynamic photograph in which the photographer shares the variable depth of field photograph to others via embedded code allowing the receiving users to dynamically manually change the focus point themselves. For example, some light field camera manufacturers provide a mechanism to embed variable depth of field photographs onto web pages through HTML embed codes. These embed codes allow the user to manually select a focus point in a picture. However, both of these techniques involve a user performing a manual selection of the focus point.

Aspects of the invention are directed to a technique for sharing a variable depth of field photograph with users in which the focus point of the photograph is selected automatically by software (i.e., through an analytical solution) to be personalized to a respective user that is viewing the photograph. Implementations of the invention eliminate the manual step of a user (either the sharing user or the receiving user) manually selecting a focus point of the variable depth of field photograph. Instead, in aspects of the invention, the system automatically determines a focus point of the variable depth of field photograph for a receiving user based on social network data of the receiving user. In this manner, the same variable depth of field photograph may be rendered with a different focus points for two different receiving users due to different social network data for the two different receiving users. Aspects of the invention are particularly useful for sharing and viewing variable depth of field photographs on social networks.

As described herein, aspects of the invention may include a method comprising: receiving a photograph comprising a plurality of photograph objects, wherein at least one photograph object of the plurality of photograph objects is focused while rest of the photograph objects are out-of-focus; identifying a profile of a user requesting to view the received photograph; extracting a set of user preferences based on the profile and historical activity of the user across social media channels; determining that a first out-of-focus photograph object of the rest of the photograph objects should be refocused based on the extracted set of user preferences; and refocusing the first out-of-focus photograph object while simultaneously rendering the at least one focused photograph object into a second out-of-focus photograph object, consequently forming a customized photograph for the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
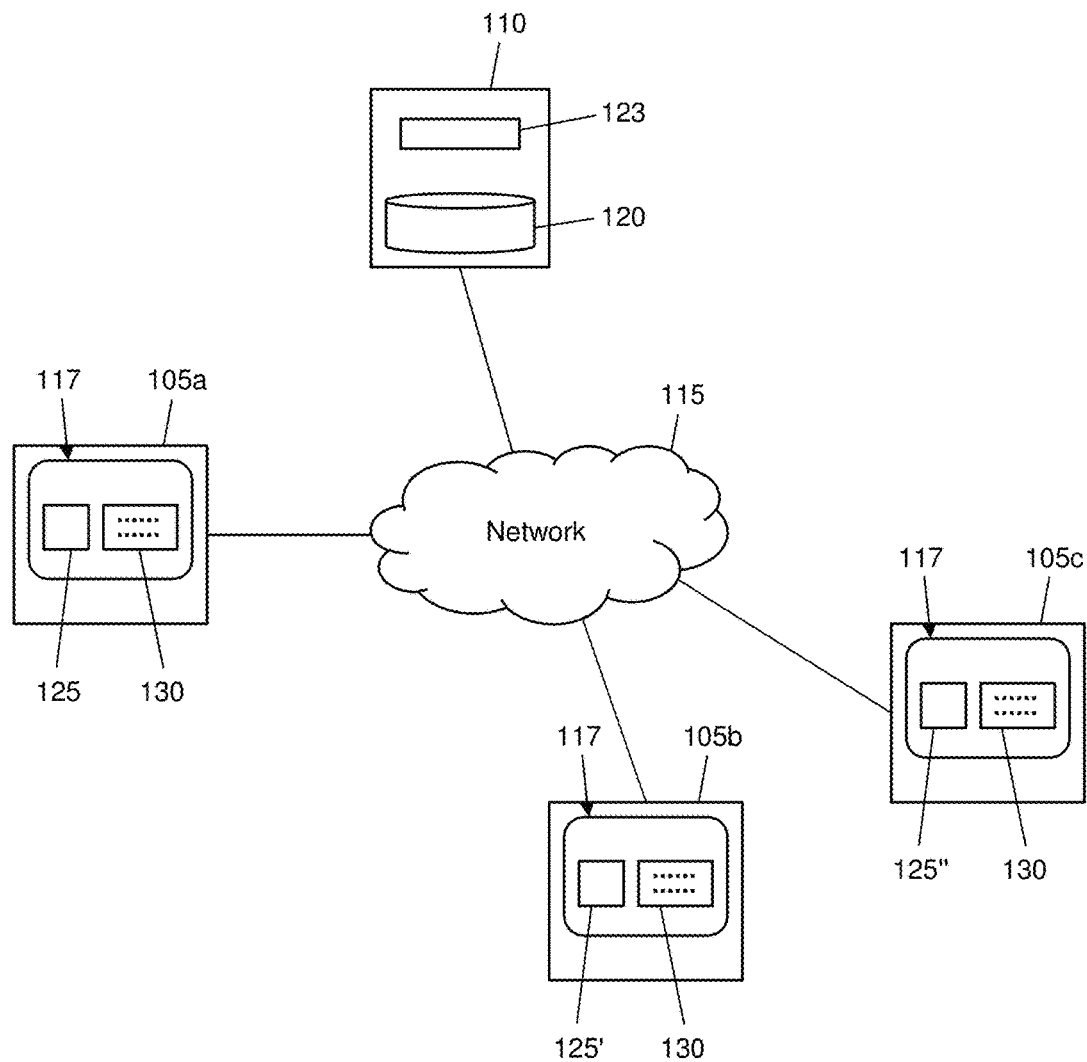
FIG. 2 shows a block diagram of an exemplary system in accordance with aspects of the invention.

FIG. 2 shows a block diagram of an exemplary system 100 in accordance with aspects of the invention. The system 100 includes user devices 105a, 105b, 105c that communicate with a social media server 110 via a computer network 115. The network 115 may be any suitable network such as a LAN, WAN, or the Internet. The user devices 105a-c may be any suitable computer device including but not limited to a desktop computer, laptop computer, tablet computer, smartphone, and smart watch. Each of the user devices 105a-c may include one or more components of the computer system 12 of FIG. 1, such as a processor, memory, display, I/O interface, etc. In embodiments, each of the user devices 105a-c is configured to display a user interface 117 that is related to the social media service of the social media server 110. The content included in the user interface 117 that is displayed on each respective user device 105a-c (e.g., a user's social media feed) may be customized based on a user profile, e.g., according to each respective user's friends, connections, likes, follows, posts, etc.

Still referring to FIG. 2, the social media server 110 may include a server computer device that hosts a social media service that is provided to the user devices 105a-c. The social media server 110 may include one or more of the components of the computer system 12 of FIG. 1. In embodiments, the social media server 110 includes a storage system 120 (which may be a storage system 34 as described with respect to FIG. 1) in which user profile data is stored for each user that has an account with the social media service. The user profile data may include a user's: social network friend and connection list; social network historical post log (e.g., what the user has posted on the social network); social network historical engagement log (e.g., comments posted by the user on the social network, posts liked by the user on the social network); and social network likes and follows (e.g., what topics or areas of interest the user is following on the social network).

The social media server 110 may also include a focus module 123 (which may be a program module 42 as described with respect to FIG. 1). According to aspects of the invention, the focus module 123 is configured to determine a contextual personalized focus of a photograph for a respective user, and to render the photograph with the contextual personalized focus when the photograph is displayed to the respective user via the user interface 117 of the social network service. In embodiments, the contextual personalized focus of a photograph is determined based in part on user profile data for each respective user, such that the contextual personalized focus of a photograph may be different for different users of the social media service. In this manner, the focus module 123 may operate to receive a variable depth of field photograph 125 from a first user device 105a, and to render and display a first version 125' of the photograph for a first viewing user and a second version 125" of the same photograph for a second viewing user, where the first version 125' of the photograph has a different focus than the second version 125" of the photograph.

Figure 3:
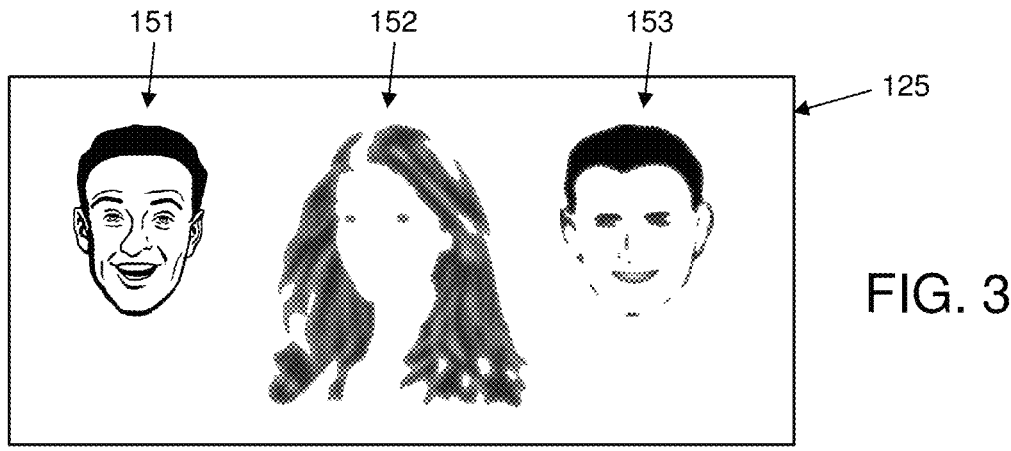
FIG. 3 shows an example of a variable depth of field photograph in accordance with aspects of the invention.

According to aspects of the invention, the first user device 105a is configured for uploading a variable depth of field photograph 125 to the social media service. For example, a user may the user interface 117 of the first user device 105a to post the photograph 125 to their account with the social media service, e.g., the user posts the photograph 125 to the wall or feed with the social media service. The user may optionally post a caption 130 with the photograph 125, wherein the caption 130 is unstructured text that describes or is otherwise related to the photograph 125. In embodiments, the photograph 125 is a digital image in general and, more specifically, is a variable depth of field photograph in which the focus of the photograph can be changed between different areas of the photograph using software techniques. FIG. 3 shows an example of a variable depth of field photograph 125 in which the focus is on a first subject 151 and in which two other subjects 152, 153 are out of focus.

Still referring to FIG. 2, the photograph 125 is uploaded to the social media server 110 when the first user posts the photograph 125 to their account with the social media service via the user interface 117 of the first user device 105a. In embodiments, the social media server 110 uses conventional techniques to determine other user accounts in which to display the photograph 125. For example, the social media server 110 may be programmed to display the photograph 125 in user accounts of users that are friends with the first user. In another example, the social media server 110 may be programmed to display the photograph 125 in user accounts of users that follow the first user. In the example shown in FIG. 2, the social media server 110 determines to display the photograph 125 in the user interface 117 of a second user logged into the social media service via user device 105b and also in the user interface 117 of a third user logged into the social media service via user device 105c.

Figure 4:
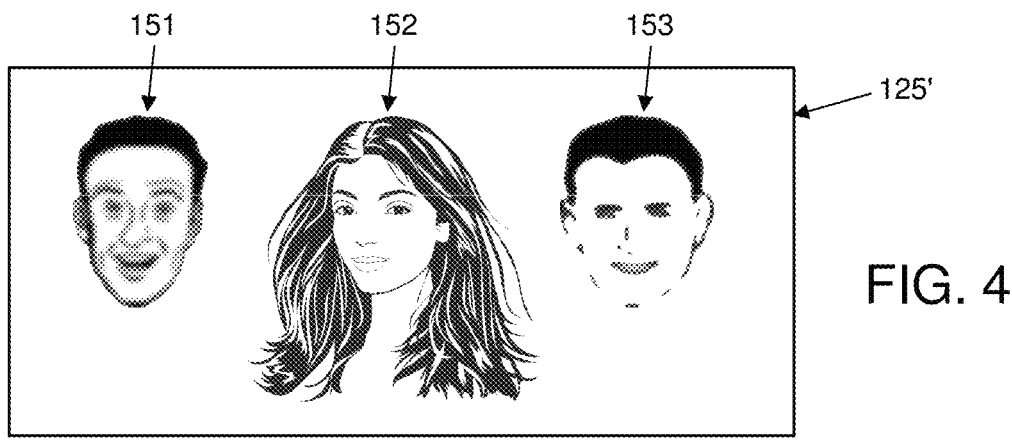
FIG. 4 shows an example of a rendering of the photograph of FIG. 3 in accordance with aspects of the invention.
Figure 5:
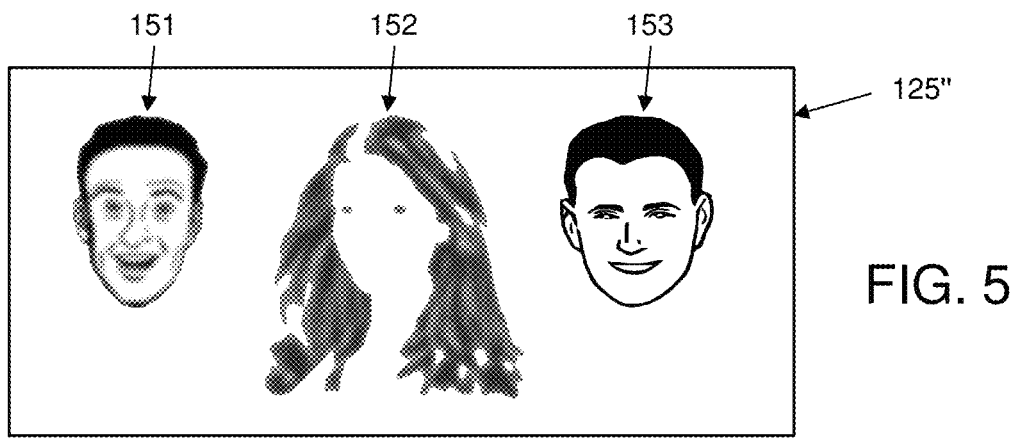
FIG. 5 shows an example of a rendering of the photograph of FIG. 3 in accordance with aspects of the invention.

According to aspects of the invention, prior to displaying the uploaded photograph 125 in the user interface of another user (also referred to as a viewing user), the focus module 123 of the social media server 110 determines a contextual personalized focus of the photograph 125 for the viewing user, and automatically renders the photograph with the contextual personalized focus when the photograph is displayed to the viewing user via the user interface 117. FIG. 4 shows a rendering of the photograph 125' that is displayed on the user interface 117 of a second user via the second user device 105b, and FIG. 5 shows a rendering of the photograph 125" that is displayed on the user interface 117 of a third user via the third user device 105c. As depicted in FIG. 4, the photograph 125' is the same as the photograph 125 except that the focus in photograph 125' is on the second subject 152 while the first subject 151 and the third subject 153 are out of focus. As depicted in FIG. 5, the photograph 125" is the same as the photograph 125 except that the focus in photograph 125" is on the third subject 153 while the first subject 151 and the second subject 152 are out of focus. In this manner, different users that follow the first user may be presented with different versions of the uploaded photograph 125 (e.g., version 125' and versions 125") in their respective social media feeds.

In accordance with aspects of the invention, the determination of a contextual personalized focus of the photograph 125 and the rendering of the resultant photograph based on the determined contextual personalized focus (e.g., photograph 125' or photograph 125") is performed automatically by the focus module 123 without either user (e.g., the posting user or the viewing user) being required to provide input to select the focus of the photograph 125. In embodiments, the determining the contextual personalized focus of the photograph 125 for a particular viewing user includes: creating a tagging profile of the photograph 125 based on analyzing the photograph 125; extracting social network data of the viewing user; analyzing focus selection criteria using the tagging profile and the social network data of the viewing user; and determining the contextual personalized focus of the photograph 125 based on a weighted personalization analysis of the focus selection criteria.

According to aspects of the invention, creating a tagging profile of a photograph based on analyzing the photograph includes at least one of: visual recognition analysis of the photograph; visual insights analysis of the photograph; and EXIF (Exchangeable photograph file format) analysis of the photograph. The focus module 123 may perform visual recognition analysis of the uploaded photograph (e.g., photograph 125) to extract visual insights related to specific content present in a photograph. For example, the focus module 123 may perform facial recognition to identify known faces appearing in the uploaded photograph, and geographic location recognition to identify specific locations shown in the uploaded photograph. The focus module 123 may perform visual insights analysis of the uploaded photograph to extract visual insights related to activities, places, interests, and people that are present in the uploaded photograph. For example this analysis may identify activities such as fishing or surfing; interests such as sports; people in generic terms such as man, woman, or child; and places in general terms such as indoors, beach, etc. The focus module 123 may perform EXIF analysis of the uploaded photograph to extract metadata associated with when the photograph was taken such as date, time, and GPS location. The visual recognition analysis, visual insights analysis, and EXIF analysis may be performed using conventional techniques.

The creating a tagging profile of the photograph may also include analyzing a caption (e.g., caption 130) associated with the uploaded photograph (e.g., photograph 125). For example, the focus module 123 may use natural language processing (NLP) to extract meaning from unstructured caption text to understand the context of what is said and how that context may relate to the photograph. The tagging profile that is generated for the uploaded photograph may include data that defines at least one of: name(s) of people in the photograph; activity depicted in the photograph; places depicted in the photograph; geo-location of the photograph; date stamp of the photograph; time stamp of the photograph.

According to aspects of the invention, extracting social network data of the viewing user includes obtaining user data that can be used to determine which aspects of the uploaded photograph relevant to the viewing user. In the context of a social network facilitated by a social media service, the focus module 123 extracts one or more of the following information from the viewing user's social network profile and social network history: the viewing user's social network friend and connection list; the viewing user's social network historical post log (e.g., what the user has posted on the social network); the viewing user's social network historical engagement log (e.g., comments posted by the user on the social network, posts liked by the user on the social network); and the viewing user's social network likes and follows (e.g., what topics or areas of interest the user is following on the social network). This information may be obtained from the user profile data of the viewing user, the user profile data being stored in the storage system 120 of the social media server 110.

According to aspects of the invention, analyzing focus selection criteria using the tagging profile and the social network data of the viewing user includes using focus selection criteria to determine which aspects of the photograph should be in focus based on the relationship of the photograph to the viewing user. In embodiments, one or more of the following focus selection criteria may be used: relationship to the viewing user; relevance to the viewing user; relevance to the caption; sentiment of the viewing user to similar photographs; and sentiment of aggregate social network users.

For the relationship to the viewing user focus selection criteria, the focus module 123 compares the relationship of people identified in the photograph (e.g., identified in the determined tagging profile) compared to friends/connections of the user on the social network (e.g., identified in the determined social network data of the viewing user). This may identify, for example, that the viewing user themselves appears in the photograph, or that a social network friend of the viewing user appears in the photograph.

For the relevance to the viewing user focus selection criteria, the focus module 123 analyzes how the content of the photograph relates to the user beyond individual relationships. For example a photograph may show a group of professional sports players (e.g., identified in the determined tagging profile) including one player from a team that the user follows on the social network (e.g., identified in the determined social network data of the viewing user).

For the relevance to the caption focus selection criteria, the focus module 123 analyzes how the caption for the photograph may specifically relate to a particular aspect of the photograph. For example the caption "Check out my brother at summer camp last year" relates to the brother of the person who posted the photograph on the social network (e.g., identified in the determined tagging profile), and the focus module 123 may identify a connection between the brother and the viewing user (e.g., identified in the determined social network data of the viewing user).

For the sentiment of the viewing user to similar photographs focus selection criteria, the focus module 123 analyzes whether the determined tagging profile is closely related to other tagging profiles for the viewing user and, if so, how the viewing user reacted to the automatically determined focus points for the other photographs having similar tagging profiles to the determined tagging profile. Through sentiment analysis, the focus module 123 may learn (e.g., determine using historical results) that the viewing user is more likely to engage (e.g., like or comment) on a photograph when dogs are in focus rather than cats, or when their friends are in focus rather than themselves.

For the sentiment of aggregate social network users focus selection criteria, the focus module 123 analyzes how, for other photographs with a similar tagging profile as the determined tagging profile, the automatically determined focus point for other viewing users influenced engagement of the other viewing users. This may generate insights such as: in 75% of cases where a picture contained a cat and a person, engagement was higher when the focus point was on the cat.

In embodiments, for a particular uploaded photograph and a particular viewing user, each of the focus selection criteria (e.g., relationship to the viewing user; relevance to the viewing user; relevance to the caption; sentiment of the viewing user to similar photographs; and sentiment of aggregate social network users) may yield an indication of a focus point in the uploaded photograph. Different focus selection criteria may indicate different focus selection points for the same uploaded photograph. One or more focus selection criteria may not indicate a focus selection point for the uploaded photograph. In the example of FIG. 4, for the uploaded photograph 125 and the first viewing user (e.g., user device 105b), the relationship to the viewing user may indicate the second subject 152 as a focus point, the relevance to the viewing user may indicate the third subject 153 as a focus point, the relevance to the caption may indicate the second subject 152 as a focus point, the sentiment of the viewing user to similar photographs may indicate the first subject 151 as a focus point, and the sentiment of aggregate social network users may not yield a focus point.

According to aspects of the invention, the focus module 123 determines a single focus point for the uploaded photograph for the viewing user (e.g., a contextual personalized focus) based on a weighted personalization analysis of the one or more focus points determined from the focus selection criteria. As described herein, different focus selection criteria may indicate different focus selection points for the same uploaded photograph. In embodiments, each of the focus selection criteria is assigned a weighting (e.g., a numerical score) and the focus module 123 determines a single focus based on the weightings. The weighting represents the importance of a given focus selection criteria to the user in the context of other focus selection criteria, and is used to determine what is most important to focus on for a user even when multiple potential personalized focus points are identified.

For example, the uploaded photograph may contain the viewing user in the foreground and their social network friend in the background. Both people are relevant to the viewing user and are identified by the focus selection criteria potential focus points. In this situation the system may weigh the engagement of the viewing user in similar situations. For example, when the viewing user has appeared with a friend in other pictures, was the viewing user more engaged with the picture where the friend was the focus or the pictures where the viewing user was the focus? By analyzing user sentiment, the focus module can learn the user's preference as to who to focus on in this picture.

Similar weighting may be used to pick a focus point when both a friend appears in the uploaded photograph and the relevance of a caption relates to a different person in the uploaded photograph. For example, analyzing the focus selection criteria for the uploaded photograph "Check out my brother at summer camp last year" might result in two potential focus points: the brother mentioned in the caption and the viewing user's friend who posted the photograph. In embodiments, the focus module 123 uses the weighted personalization analysis to determine which one of the potential identified focus points to select as the contextual personalized focus.

The focus module 123 may use the assigned weightings with any desired formula to determine the single focus for the uploaded photograph. In one example, the focus module 123 sums the respective weighting values of the respective determined focus points, and the focus point having the highest summed weighting score is deemed the single focus point for the uploaded photograph for the viewing user. Continuing the example of FIG. 4, the relationship to the viewing user may have a weighting of 2.0×, the relevance to the viewing user may have a weighting of 1.5×, the relevance to the caption may have a weighting of 1.7×, the sentiment of the viewing user to similar photographs may have a weighting of 1.0×, and the sentiment of aggregate social network users may have a weighting of 0.6×. By summing the weightings of the respective focus points, it is determined that the first subject 151 has a summed weighting score of 1.0×, the second subject 152 has a summed weighting score of 2.0×+1.7×=3.7×, and the third subject 153 has a summed weighting score of 1.5×. In this example, the second subject 152 has the highest summed weighting score of the possible focus points identified by the focus selection criteria, and the focus module 123 thus deems the second subject 152 as the single focus point for the uploaded photograph for the viewing user (e.g., the contextual personalized focus for the viewing user).

According to aspects of the invention, the weighting value of each focus selection criteria may be defined by the user in the user profile data. For example, the user may wish to designate one focus selection criteria (e.g., photographs of friends) as more important than another focus selection criteria (e.g., photographs of themselves).

According to aspects of the invention, the focus module 123 may be configured to adjust the weighting value of each focus selection criteria based on input from a viewing user after the viewing user has been presented with a photograph with an automatically determined contextual personalized focus. For example, the focus module 123 may be programmed to learn, based on the viewing user's inputs, whether a determined contextual personalized focus was liked or disliked by the viewing user.

According to aspects of the invention, after determining the single focus point for the uploaded photograph for the viewing user (e.g., the contextual personalized focus for the viewing user), the focus module 123 renders the photograph using the determined focus point and displays the rendered photograph via the interface of the viewing user. For the example shown in FIG. 4, the contextual personalized focus for the viewing user is determined to be the second subject 152, and the photograph 125' is rendered with the second subject 152 in focus and the other subjects (151 and 153) out of focus. For the example shown in FIG. 5, the contextual personalized focus for the viewing user is determined to be the third subject 153, and the photograph 125" is rendered with the third subject 153 in focus and the other subjects (151 and 152) out of focus. The photographs 125' and 125" are then published to the respective feeds of the respective users in the interface 117 of the social media service, as shown in FIG. 2. Conventional software tools may be used to adjust the focus point of the variable depth of field photograph, and the photograph thus rendered is published to the viewing user's social network feed.

Figure 6:
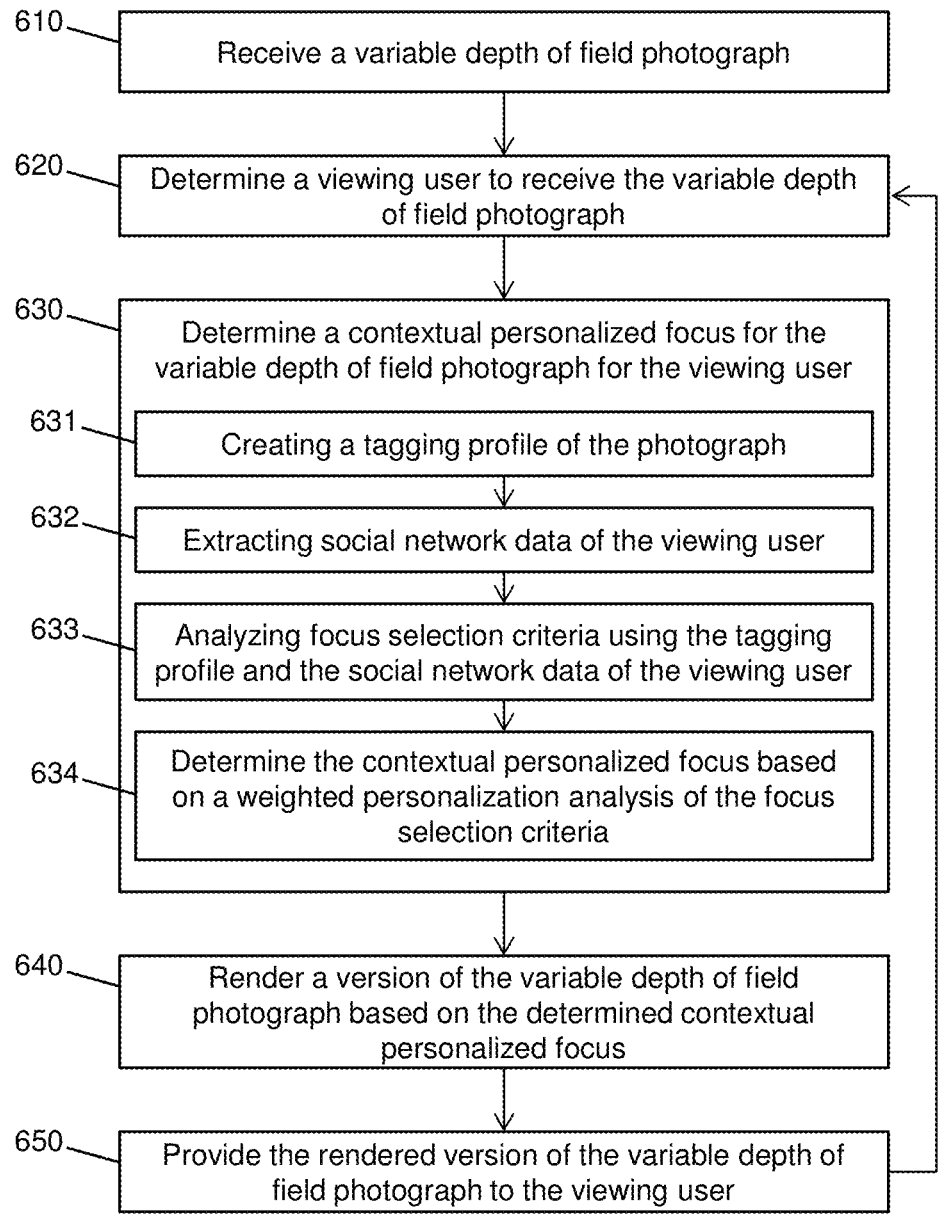
FIG. 6 shows a flowchart of a method in accordance with aspects of the invention.

FIG. 6 depicts exemplary methods in accordance with aspects of the invention. The steps of the method may be performed in the system of FIG. 2 and are described with reference to the elements and steps described with respect to FIG. 2.

At step 610, the system receives a variable depth of field photograph from a user. In embodiments, as described with respect to FIG. 2, step 610 may include a focus module 123 running on a social media server 110 receiving the variable depth of field photograph when a first user posts the variable depth of field photograph to their social media account.

At step 620, the system determines a viewing user to receive the variable depth of field photograph. In embodiments, as described with respect to FIG. 2, the focus module 123 may determine the viewing user as a user of the social media service that follows or is connected to the first user that posted the photograph at step 610.

At step 630, the system determines a contextual personalized focus for the variable depth of field photograph for the viewing user. Step 630 may be performed in the manner described with respect to FIG. 2, and may include, for example: creating a tagging profile of the photograph (step 631); Extracting social network data of the viewing user (step 632); analyzing focus selection criteria using the tagging profile and the social network data of the viewing user (step 633); and determining the contextual personalized focus based on a weighted personalization analysis of the focus selection criteria (step 634).

At step 640, the system renders a version of the variable depth of field photograph (from step 610) based on the determined contextual personalized focus (from step 630). Step 640 may be performed in the manner described with respect to FIG. 2 and may include, for example, using one or more software tools to adjust the focus point of the variable depth of field photograph to coincide with the contextual personalized focus that was determined at step 630.

At step 650, the system provides the rendered version of the variable depth of field photograph (from step 640) to the viewing user (from step 620). Step 650 may be performed in the manner described with respect to FIG. 2, and may include the social media server 110 publishing the rendered version of the variable depth of field photograph to the social media feed of the second user, i.e., to be displayed as content in an interface 117 of the social media service.

The process may return to step 620 to repeat steps 620, 630, 640, 650 for another determined viewing user. In this manner, a single photograph received at step 610 may be rendered differently for different social media users.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computer device, a photograph;
    determining, by the computer device, a viewing user to receive the photograph;
    determining, by the computer device, a contextual personalized focus for the photograph for the viewing user;
    rendering, by the computer device, a version of the photograph based on the determined contextual personalized focus; and
    providing, by the computer device, the rendered version of the photograph to the viewing user,
    wherein the determining the contextual personalized focus comprises;
        creating a tagging profile of the photograph;
        extracting social network data of the viewing user;
        analyzing focus selection criteria using the tagging profile and the social network data of the viewing user; and
        determining the contextual personalized focus based on a weighted personalization analysis of the focus selection criteria.

2. The method of claim 1, wherein the photograph is a variable depth of field photograph.

3. The method of claim 2, wherein:
    the photograph is received from a first user of a social media service; and
    the viewing user is a second user of the social media service.

4. The method of claim 3, wherein the determining the viewing user comprises determining that the second user is a social media friend or a social media connection of the first user in the social media service.

5. The method of claim 3, wherein the providing the rendered version of the photograph comprises publishing the rendered version of the photograph to a feed of the second user in an interface of the social media service.

6. The method of claim 3, wherein the viewing user is a first viewing user, the contextual personalized focus is a first contextual personalized focus, and the version is a first version, and further comprising:
    determining, by the computer device, a second viewing user to receive the photograph;
    determining, by the computer device, a second contextual personalized focus for the photograph for the second viewing user;
    rendering, by the computer device, a second version of the photograph based on the determined contextual personalized focus, wherein the second version of the photograph has a different focus point than the first version of the photograph; and
    providing, by the computer device, the second rendered version of the photograph to the second viewing user.

7. The method of claim 1, wherein the computer device comprises a server of the social media service.

8. The method of claim 1, wherein a social media service provider at least one of creates, maintains, deploys and supports the computer device.

9. The method of claim 1, wherein steps of claim 1 are provided by a social media service provider on a subscription, advertising, and/or fee basis.

10. A method, comprising:
    receiving, by a computer device, a photograph;

determining, by the computer device, a viewing user to receive the photograph;

determining, by the computer device, a contextual personalized focus for the photograph for the viewing user;

rendering, by the computer device, a version of the photograph based on the determined contextual personalized focus; and providing, by the computer device, the rendered version of the photograph to the viewing user, wherein the photograph is a variable depth of field photograph;

the photograph is received from a first user of a social media service; and the viewing user is a second user of the social media service; and the rendering the version of the photograph comprises adjusting a focus point of the variable depth of field photograph to coincide with the determined contextual personalized focus.

11. A system comprising:

a CPU, a computer readable memory and a computer readable storage medium associated with a computing device;

program instructions to receive a photograph from a posting user of a social media service;

program instructions to determine a first contextual personalized focus for the photograph based on social network data of a first viewing user;

program instructions to render a first version of the photograph based on the first contextual personalized focus;

program instructions to provide the first rendered version of the photograph to a social media feed of the first viewing user;

program instructions to determine a second contextual personalized focus for the photograph based on social network data of a second viewing user;

program instructions to render a second version of the photograph based on the second contextual personalized focus; and program instructions to provide the second rendered version of the photograph to a social media feed of the second viewing user, wherein the determining the contextual personalized focus comprises;

creating a tagging profile of the photograph;

extracting social network data of the viewing user;

analyzing focus selection criteria using the tagging profile and the social network data of the viewing user; and determining the contextual personalized focus based on a weighted personalization analysis of the focus selection criteria; and the program instructions are stored on the computer readable storage medium for execution by the CPU via the computer readable memory.

12. The system of claim 11, wherein the photograph is a variable depth of field photograph.

13. The system of claim 12, wherein the first version of the photograph has a different focus point than the second version of the photograph.

* * * * *